May 23, 1939.  J. A. UNDERWOOD  2,159,575

COOKING RANGE

Filed Dec. 20, 1937  2 Sheets-Sheet 1

Inventor:
John A. Underwood,

May 23, 1939.  J. A. UNDERWOOD  2,159,575
COOKING RANGE
Filed Dec. 20, 1937  2 Sheets-Sheet 2
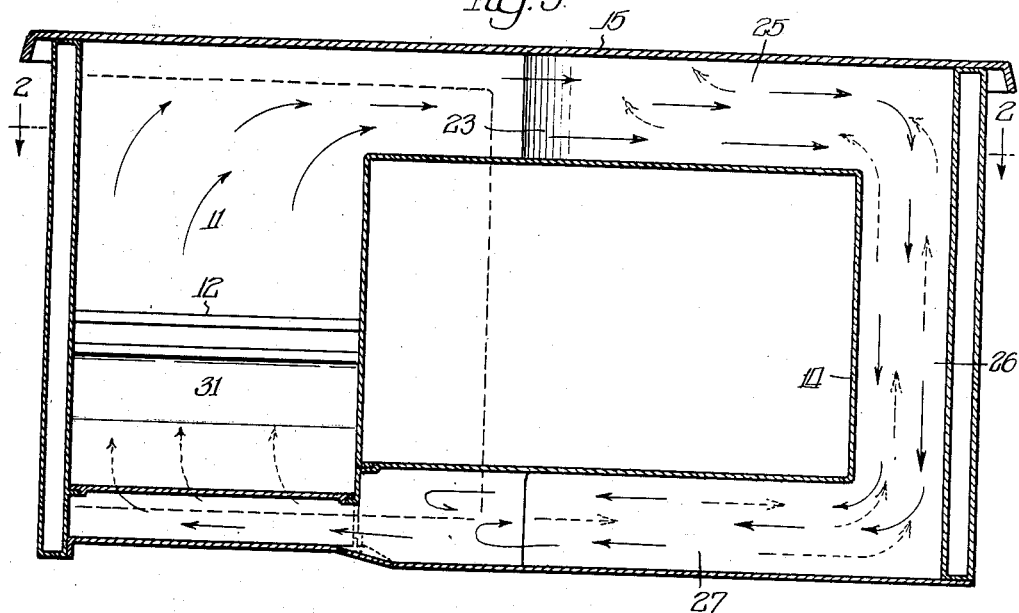
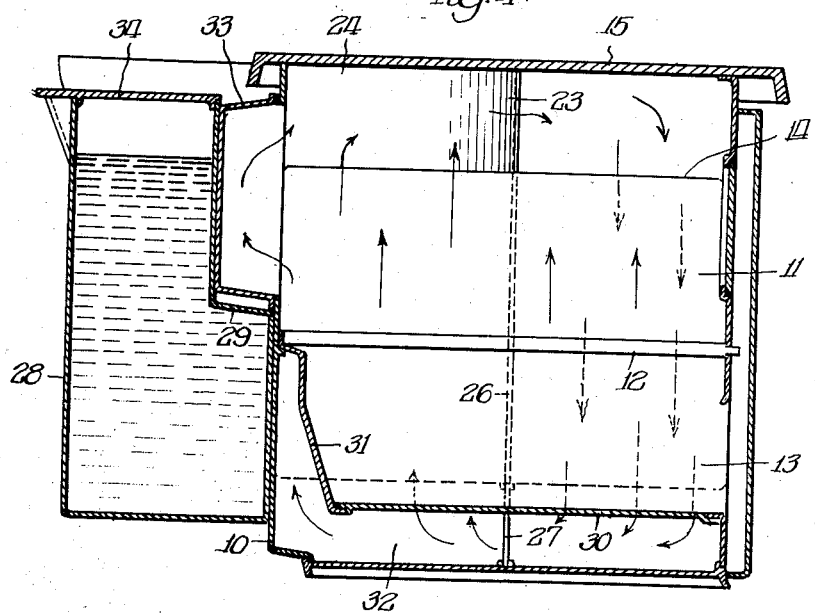
Inventor:
John A. Underwood,
By Cromwell Greist & Harden
Attys Patented May 23, 1939

2,159,575

UNITED STATES PATENT OFFICE 2,159,575

COOKING RANGE

John A. Underwood, Evanston, Ill., assignor to Montgomery Ward & Co., Incorporated, Chicago, Ill., a corporation of Illinois Application December 20, 1937, Serial No. 180,732

5 Claims. (Cl. 126—34)

This invention relates to cooking ranges of the type in which solid fuel is burned.

In many ranges of this type provision is made for heating water through the medium of reservoirs which form adjuncts or attachments to the ranges. This is particularly true of ranges used in rural districts where no fixed water supply is available and the usual water backs of cooking stoves cannot be employed. In many stoves such as referred to it is difficult to heat the reservoirs because of limited heating surfaces or flues, with the result that the reservoirs are small and can supply only restricted quantities of hot water.

It is the primary object of the present invention to provide a novel form of cooking range which will supply the deficiencies of the ranges above outlined and to so construct the same that an abundance of hot water will be available at all times.

Furthermore, the invention aims to provide a cooking range wherein novel means are incorporated for the circulation of the products of combustion, and in such circulation to utilize the products of combustion to the greatest advantage in heating the water reservoir.

Other objects will appear as the nature of the improvements is better understood, the invention consisting substantially in the novel construction, combination and arrangement of parts hereinafter fully described, illustrated in the accompanying drawings, and finally pointed out in the appended claims.

The form of the invention herein shown and described is believed to be a preferred embodiment thereof, but it is to be understood that the same is susceptible to change, variation and modification in the arrangement of the parts. The form illustrated, therefore, is to be taken from the illustrative stand-point only, and not as imposing restriction or limitation upon the invention.

In the drawings:

Fig. 3 is a longitudinal vertical sectional view, as on the line 3—3, Fig. 2;

Fig. 4 is a vertical transverse sectional view, as on the line 4—4, Fig. 2.

Figure 1:
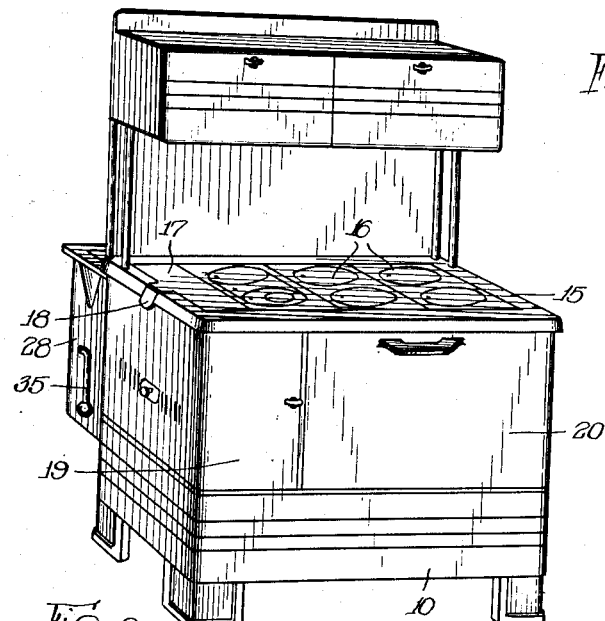
Fig. 1 is a perspective view of a cooking range embodying the herein described invention.
Figure 2:
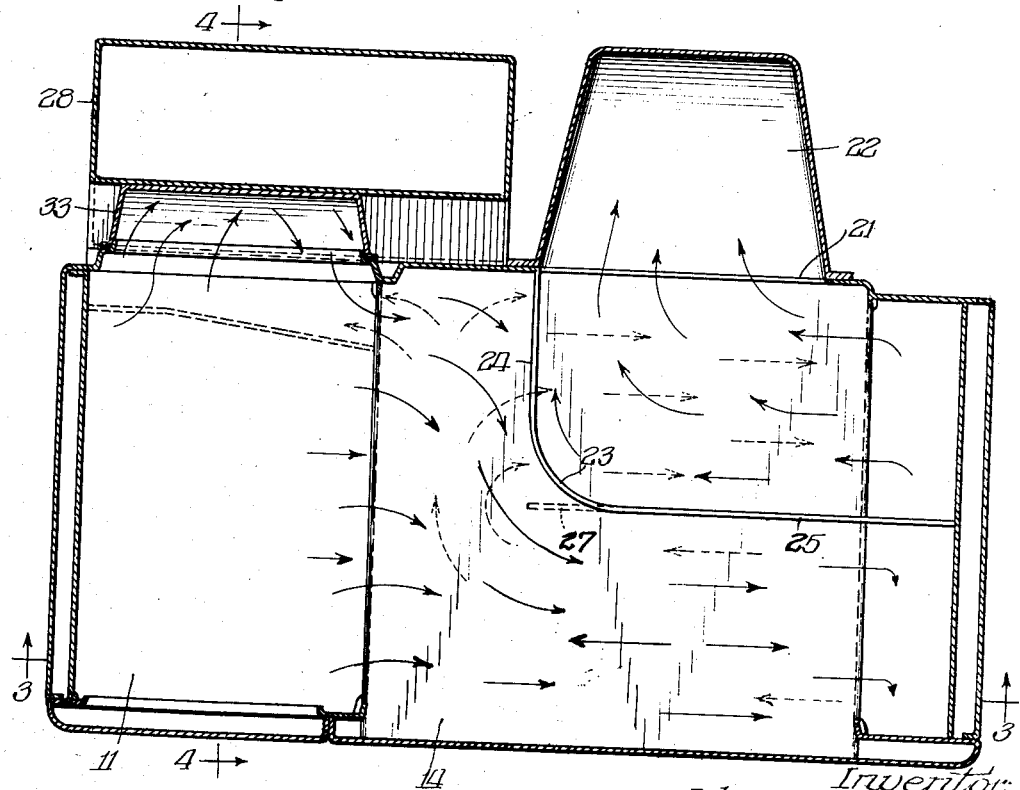
Fig. 2 is a sectional plan view, as on the line 2—2, Fig. 3.

Referring in detail to the accompanying drawings, the numeral 10 designates the body of the herein described stove. It includes the usual fire pot 11, grates 12, ash pit 13 and oven 14.

The numeral 15 designates the top of the stove in which is included the usual openings covered by the usual removable plates 16, and at one end of said top 15 is provided a hinged lid 17 having a handle grip 18. When the hinged lid 17 is raised communication is afforded with the fire pot 11 for introducing the fuel thereto.

Further access to the fire pot 11 may be had through a door 19, which also affords access to the ash pit 13. Access to the oven 14 also is afforded by a door 20.

At the rear of the body 10 there is provided an opening 21 which communicates with a flue connection 22 to which the chimney of the stove may be connected. Arranged in front of the opening 21, and extending upwardly from the top of the oven 14 to the top 15 of the body 10, is a flue partition 23. This partition 23 has a transverse extension 24 and a longitudinal extension 25, the latter being directed to the adjacent end wall of the body 10 where it is connected with a vertical flue partition 26. The partition 26 ranges from the bottom of the body 10 to the extension 25, the partition 26 being connected at its lower end to a longitudinal flue partition 27 which extends from the bottom of the body 10 to the bottom of the oven 14. The partitions 23, 26 and 27 divide the space at the top and bottom of the oven 14 and at the end thereof which is adjacent one end of the body 10, into two vertical flues by which the products of combustion will pass from the fire box over the top of the oven, down at the end of the oven which is opposite to the fire box end, below the oven and around the free end of the partition 27, then back under the oven, upwardly at the end of the oven opposite to the fire box end, over the top of the oven, and out through the opening 21 to the chimney. The path of the products of combustion are indicated by arrows shown in full and dotted lines.

At the rear of the body 10 a water reservoir 28 is suitably supported on the body 10. Its vertical dimension is substantially the vertical dimension of the body 10, as clearly seen in Fig. 4. At approximately midway of the height of the reservoir 28 it has an offset 29, and by reason of this offset the lower end of the reservoir 28 is wider than its upper end.

The reservoir 28 is designed to be heated by conduction from the fire pot 11 and the ash pit 13, or that portion of the body 10 which constitutes the rear end of the ash pit. To this end the contiguous face of the reservoir 28 which abuts the body of the stove 10 at its rear will absorb the heat from the fire pot 11 and the ash pit. It is proposed, however, also to utilize the products of combustion to heat the reservoir 28, and to the accomplishment of this the bottom of the ash pit, designated 30, is spaced from the bottom of the stove body 10, while the rear end of the ash pit 31 likewise is spaced from the rear wall of the body 10, thereby constituting a substantially L-shaped pocket 32 beneath the ash pit bottom 30 and its end 31 into which the products of combustion will enter and serve to heat the rear wall of the body 10. Because of contact of the contiguous lower wall of the reservoir 28 the latter will absorb the heat of the pocket 32.

The rear end of the fire pot 11 has an extension chamber 33 formed thereat, which extension chamber projects over the offset 29 of the reservoir 28 and abuts the contiguous wall of the upper portion of the reservoir 28 that extends above the offset 29. In this contact the heat generated in the fire pot is transmitted through the chamber 33 and absorbed by the adjacent wall of the reservoir 28. In this manner the heat of the fire pot 11 will heat the water in the upper end of the reservoir 28, and being supplemented by the heat transmitted from the pocket 32, the entire surface of the reservoir 28 from its lower to its upper ends will be subjected not only to the direct heat radiated from the fire pot, but also to the heat of the products of combustion as they pass from the fire pot through the circulating flues to the chimney of the stove.

From the foregoing description it is apparent that the herein described invention provides a novel construction of cooking range in which the products of combustion are utilized to the best advantage, and by which a relatively large reservoir for hot water may be employed and kept constantly at high temperature so long as fire is burning within the fire pot 11.

It will be obvious that suitable provision is made for access to the reservoir 28, as by a displaceable top 34, to permit introduction of water to the reservoir, and the latter is also provided with a suitable faucet 35 for withdrawing the heated water from the reservoir.

I claim:

1. In a cooking range, the combination with the body thereof, its fire pot and its ash pit, of a water reservoir arranged at the rear of the body, the fire pot having an extension chamber with which the reservoir is in direct contact, and the body of the range having a pocket within the ash pit with which the reservoir also is in contact, said pocket being in communication with the flues of the range to receive the products of combustion as they pass through the range whereby to heat said pocket.

2. In a cooking range, the combination with the body thereof, its fire pot and its ash pit, of a water reservoir arranged at the rear of the body, the fire pot having an extension chamber, the reservoir having an offset portion receiving said extension chamber to permit the reservoir to contact the extension chamber and be heated at its upper portion by the heat of the fire pot, the body of the range having a pocket within the ash pit with which the reservoir also is in contact, said pocket being in communication with the flues of the range to receive the products of combustion as they pass through the range whereby to heat said pocket.

3. In a cooking range, the combination with the body thereof, its fire pot and its ash pit, and circulating flues in communication with the fire pot and the flue connection of the body, a pocket being formed beneath the ash pit bottom and the rear wall of the body and adapted to receive the products of combustion as they circulate through said flues, whereby to heat said pocket, of a water reservoir arranged at the rear of said body and in direct contact with the rear wall of the latter at the fire pot and said pocket, whereby the heat of said fire pot and of said pocket is utilized to heat said water reservoir.

4. In a cooking range, the combination with the body thereof, its fire pot and its ash pit, and circulating flues in communication with the fire pot and the chimney connection of the body, a pocket being formed beneath the ash pit bottom and the rear wall of the body and adapted to receive the products of combustion as they circulate through said flues, whereby to heat said pocket, of a water reservoir arranged at the rear of said body and in direct contact with the rear wall of the latter at said pocket, and an extension chamber formed at the end of the fire pot and receiving the heat generated in the fire pot, the water reservoir being provided with an offset portion in direct contact with said extension chamber, the heat of the fire pot and of said pocket being utilized to heat said water reservoir.

5. In a cooking range, the combination with the body thereof, its fire pot and its ash pit, of a water reservoir arranged at the rear of the body, the fire pot having an extension chamber with which the reservoir is in direct contact, and the body of the range having a substantially L-shaped pocket beneath the bottom of the ash pit and the rear end thereof and the rear wall of the body, said pocket being in communication with the flues of the range to receive the products of combustion as they pass through the range whereby to heat said pocket.

JOHN A. UNDERWOOD.